United States Patent
Brown et al.

(10) Patent No.: US 8,667,384 B2
(45) Date of Patent: Mar. 4, 2014

(54) USER INTERFACE FOR EDITING PHOTO TAGS

(75) Inventors: Michael S. Brown, Kitchener (CA);
Gerhard D. Klassen, Waterloo (CA);
Terrill Dent, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1129 days.

(21) Appl. No.: 11/746,270

(22) Filed: May 9, 2007

(65) Prior Publication Data
US 2008/0282177 A1      Nov. 13, 2008

(51) Int. Cl.
G06F 17/21        (2006.01)
G06K 9/18         (2006.01)

(52) U.S. Cl.
USPC ........... 715/230; 715/232; 715/233; 715/705; 715/711; 715/856; 382/282; 382/307

(58) Field of Classification Search
USPC ......... 715/200, 230, 232, 233, 282, 705, 711, 715/856; 382/282, 307
See application file for complete search history.

(56) References Cited

U.S. PATENT DOCUMENTS

| | | | |
|---|---|---|---|
| 5,990,862 A | 11/1999 | Lewis | |
| 6,301,586 B1 | 10/2001 | Yang et al. | |
| 6,437,797 B1 | 8/2002 | Ota | |
| 6,629,104 B1 * | 9/2003 | Parulski et al. | 1/1 |
| 7,274,822 B2 * | 9/2007 | Zhang et al. | 382/224 |
| 7,415,662 B2 * | 8/2008 | Rothmuller et al. | 715/200 |
| 7,783,085 B2 * | 8/2010 | Perlmutter et al. | 382/118 |
| 2002/0055955 A1 * | 5/2002 | Lloyd-Jones et al. | 707/512 |
| 2003/0033296 A1 * | 2/2003 | Rothmuller et al. | 707/3 |
| 2004/0174434 A1 | 9/2004 | Walker et al. | |
| 2004/0264780 A1 | 12/2004 | Zhang et al. | |
| 2005/0041015 A1 | 2/2005 | Kohda et al. | |
| 2005/0162523 A1 | 7/2005 | Darrell et al. | |
| 2007/0022391 A1 * | 1/2007 | Kim et al. | 715/856 |

FOREIGN PATENT DOCUMENTS

| | | |
|---|---|---|
| EP | 1566752 A2 | 8/2005 |
| WO | 00/24131 A | 4/2000 |
| WO | 02057959 A2 | 7/2002 |
| WO | 2005/060236 A | 6/2005 |

OTHER PUBLICATIONS

Rodden et al, "How Do People Manage Their Digital PHotographs?", Apr. 10, 2003, publisher: ACM, pp. 1-8.*

(Continued)

*Primary Examiner* — Stephen Hong
*Assistant Examiner* — Wilson Tsui
(74) *Attorney, Agent, or Firm* — Novak Druce Connolly Bove + Quigg LLP

(57) ABSTRACT

There is disclosed a user interface for editing photo tags. In an embodiment, the user interface embodies a method of editing photo tags, comprising: displaying a photo on a display; providing a photo tagging mode for editing tags for the displayed photo; and for each tag used to tag a subject or object in the photo, identifying the tag type and associating a unique pointer for each tag type to highlight the corresponding tagged subject or object. The method may further comprise: displaying a tag list of tags used to tag a subject or object in the photo; and identifying the tag type of each tag in the tag list. In an embodiment, context sensitive information may be accessed for each tag depending on the tag type.

21 Claims, 10 Drawing Sheets

(56) References Cited

OTHER PUBLICATIONS

Summons to attend oral proceedings pursuant to Rule 115(1)EPC mailed Apr. 10, 2012. In corresponding application No. 07107867.9.
Latif, Khalid et al.; An Approach for a Personal Information Management System for Photos of a Lifetime by Exploiting Semantics; pp. 167-177; 2006.
Third Office Action mailed Aug. 29, 2012, in corresponding Chinese patent application No. 200810215449.4.
English translation for the Third Office Action mailed Aug. 29, 2012, in corresponding Chinese patent application No. 200810215449.4.
Second Office Action mailed Jan. 30, 2012, in corresponding Chinese patent application No. 200810215449.4.
English translation of the Second Office Action mailed Jan. 30, 2012, in corresponding Chinese patent application No. 200810215449.4.
Office Action mailed Jan. 22, 2013, in corresponding Canadian patent application No. 2,630,944.
Canadian Office Action mailed Oct. 24, 2011. In corresponding application No. 2,630,944.
Canadian Office Action mailed Sep. 9, 2010. In corresponding application No. 2,630,944.
English Translation Office Action mailed Dec. 7, 2010. In corresponding application No. 200810215449.4.
Office Action mailed Dec. 7, 2010. In corresponding application No. 200810215449.4.
English translation of the Fourth Office Action mailed Dec. 25, 2012, in corresponding Chinese patent application No. 200810215449.4.
Fourth Office Action mailed Dec. 25, 2012, in corresponding Chinese patent application No. 200810215449.4.
Notification of Grant of Rights for Invention Patent on Apr. 7, 2013, in corresponding Chinese patent application No. 200810215449.4.
English translation of the Notification of Grant of Rights for Invention Patent on Apr. 7, 2013, in corresponding Chinese patent application No. 200810215449.4.
Office Action mailed Oct. 7, 2013, in corresponding Indian patent application No. 1131/DEL/2008.

\* cited by examiner

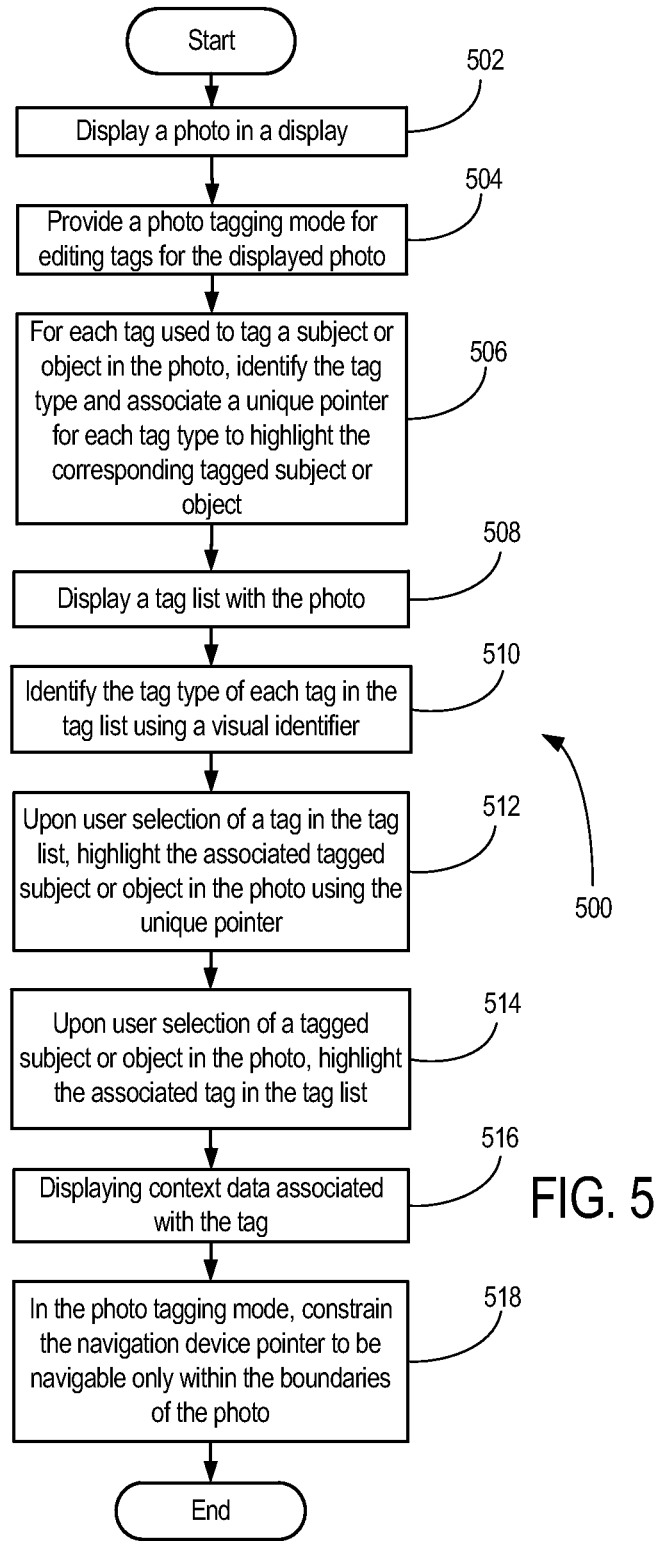

USER INTERFACE FOR EDITING PHOTO TAGS

FIELD OF THE INVENTION

The present invention relates generally to a user interface for editing photo tags.

BACKGROUND

Identifying people or objects in photographs is popular in many online contexts, such as photo sharing, social networking, etc. Typically, these online applications use point-and-click driven input methods to allow users to quickly identify specific points in a photograph. For example, after entering a "tagging" mode, the user will click on the photo at the point in the photo he wishes to identify and then enter information about that point. Later, there may be ways for the user to go back and view the information that was associated with the point in the photo, either by "hovering" the mouse pointer over the identifying information, or over the point in the photograph. However, on a wireless mobile communication device where there are constraints on the size of the display and the flexibility of the input method, some of these common techniques used on desktops and laptops with full sized screens do not work as well.

What is needed is an improved user interface for editing photo tags in a smaller display, such as may be found on a wireless mobile communication device.

BRIEF DESCRIPTION OF THE DRAWINGS

In the figures which illustrate exemplary embodiments:

FIG. 5 is an illustrative flowchart of a method for editing photo tags in accordance with an embodiment.

DETAILED DESCRIPTION

As noted above, the present invention relates to a user interface for editing photo tags, particularly within a smaller display, such as may be found on a wireless mobile communication device.

Figure 1:
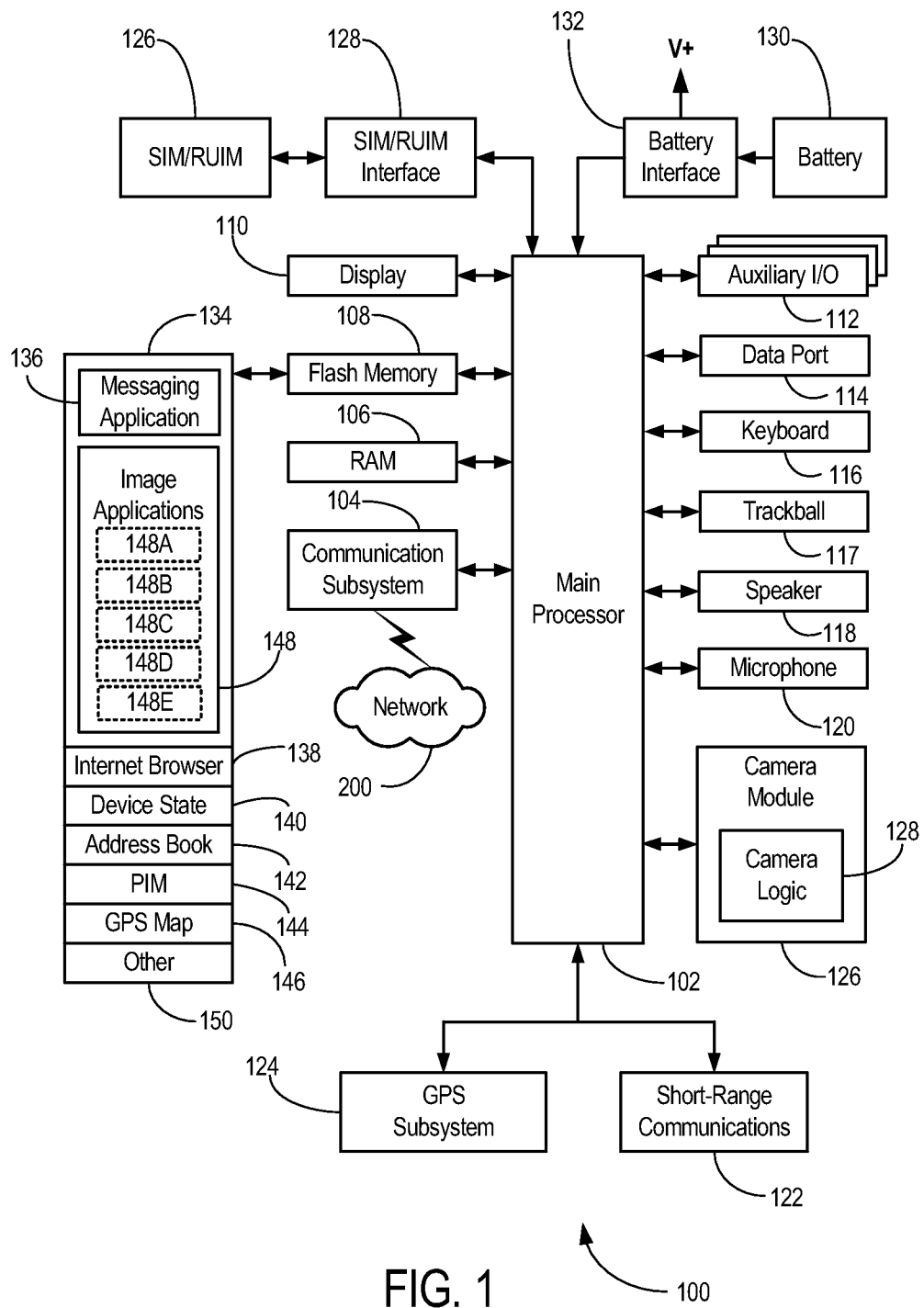
FIG. 1 is an illustration of a device in accordance with an embodiment.

In an illustrative embodiment, the invention may be practiced with a handheld mobile communication device in a wireless operating environment. Shown in FIG. 1 is a schematic block diagram of an illustrative handheld mobile communication device 100. The communication device 100 may comprise a number of components, including a main processor 102 which controls the overall operation of communication device 100. Communication functions, including data and voice communications, may be performed through a communication subsystem 104. The communication subsystem 104 may receive messages from and send messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122, a GPS subsystem 124, a camera module 126, and associated camera logic 128.

Some of the subsystems of the communication device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item.

The camera module 126 may be adapted to capture an image through a lens onto a light sensitive image sensor such as a charge coupled device (CCD) sensor array or a complementary metal oxide semiconductor (CMOS) sensor array. The camera lens may be a fixed focus lens, or a variable focus lens with or without zoom features and controlled by camera logic 128 to focus an image onto the CCD or CMOS sensor array. The size and pixel density of the CCD or CMOS sensor array may be suitably selected for the image resolution required for a particular application. Camera logic 128 may also control the camera lens aperture and/or shutter speed by incorporating a suitable light exposure meter. Image capture using camera module 126 may initiated by a user controlling a dedicated camera shutter, or a context dependent programmable button or key (on keyboard 116, for example) that may act as a camera shutter button.

Once captured by the CCD or CMOS sensor array, the image may then be processed by camera logic 128 into a suitable digital image file format such as Joint Photographic Experts Group (JPEG), Tagged-Image File Format (TIFF), Bit Mapping (BMP), different variations on these standard image file formats, or a vendor proprietary RAW image format. The image file format may allow for the addition of image meta-data to an image file in an industry standards exchangeable image file format (EXIF), or in some vendor proprietary meta-data format. The image file may then be stored in available device storage such as RAM 106 or flash memory 108, and displayed on display 110.

Still referring to FIG. 1, operating system software used by the main processor 102 is typically stored in a persistent store such as flash memory 108. Those skilled in the art will appreciate that the operating system, specific device applications, or parts thereof, may be temporarily loaded into a volatile store, such as the RAM 106, for processing by main processor 102.

The communication device 100 may send and receive communication signals over the wireless network 200 after required network registration or activation procedures have been completed. Network access may be associated with a subscriber or user of the communication device 100.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100. The battery 130 may be used to power all components and modules in the communication device 100, including the camera module 126 and associated camera logic 128.

The main processor 102, in addition to its operating system functions, enables execution of various software applications 134 on the communication device 100. A subset of software applications 134 that control basic device operations, including data and voice communication applications, will normally be installed on the communication device 100 during its manufacture.

The software applications 134 may include a messaging application 136. The messaging application 136 can be any suitable software program that allows a subscriber or user of the communication device 100 to send and receive wireless text communications. Various alternatives exist for the messaging application 136 as is well known to those skilled in the art. Messages that have been sent or received by the user are typically stored in local storage such as flash memory 108 of the communication device 100, or in some other suitable storage element in the communication device 100. In an alternative embodiment, some of the sent and received messages may be stored remotely from the communication device 100 such as in a data store of an associated host system that the communication device 100 communicates with. In an embodiment, the messaging application 136 may include a Message List user interface that is configured to allow a user to see a list of message objects (i.e. email messages) in a convenient list form. This will be described in detail further below.

Still referring to FIG. 1, communication device 100 may execute an Image Applications Module 148 that may be operatively integrated with camera module 126, camera logic 128, main processor 102, RAM 106, display 110 and various other modules and components to provide various image application functions for the images captured by the camera module 126. Image Applications Module 148 may include various sub modules which may interact with each other, and with other application modules such as the messaging application 136, Internet browser module 138, address book module 142, etc. in order to perform various functions.

In an embodiment, one of the sub modules of the Image Applications Module 148 may be a photo tagging module 148A configured to allow a user to identify various subjects and objects within a photo. Photo tagging module 148A will be discussed in more detail further below.

In an embodiment, another of the sub modules of the Image Applications Module 148 may be a photo tagging module 148A configured to allow a user to select a photo tag from a list of tags associated with various subjects and objects within a photo. Photo tag selection module 148B will be discussed in more detail further below.

The communication device 100 may further include a device state module 140, an address book 142, a Personal Information Manager (PIM) 144, and various other modules 150. Additional software applications may also be loaded onto the communication device 100 through at least one of the wireless network 200, the auxiliary I/O subsystem 112, the data port 114, the short-range communications subsystem 122, or other device subsystem 124.

Figure 2:
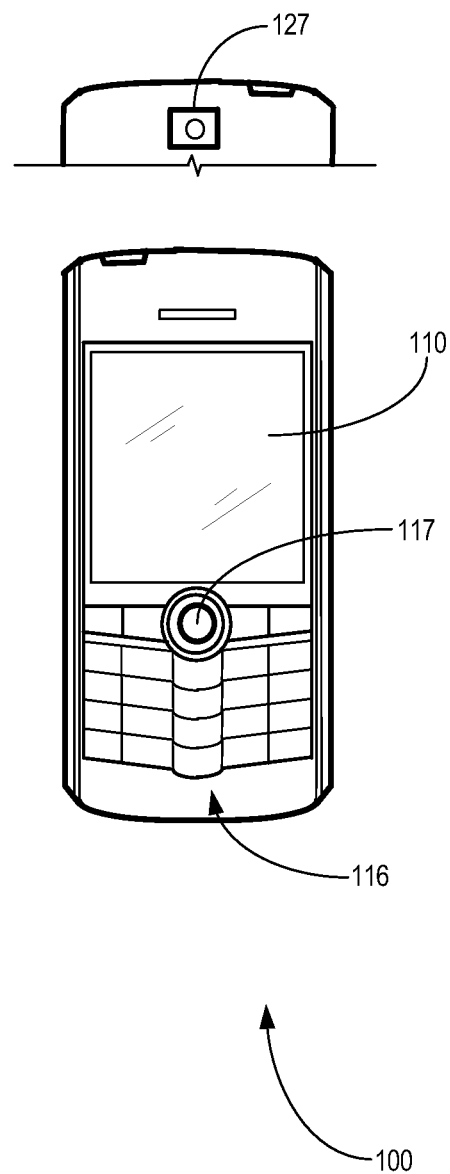
FIG. 2 is a schematic block diagram of a communication subsystem component in the device of FIG. 1.

Now referring to FIG. 2, shown is an illustrative front view of a handheld mobile communication device 100 that may provide a suitable operating environment. As shown, the communication device 100 may include a display 110, a keyboard 116, and other input or navigation means such as a trackball 117. The display 110 may be configured to display various screens allowing the user of device 100 to view screen outputs from the various software applications 134, including the image applications 148. Display 110 may also be configured to provide a touch-sensitive screen input in response to a prompt or query displayed on display 110. The communication device 100 may further include a camera lens that may be used to capture an image as described above with reference to FIG. 1. In an embodiment, the integrated camera 126 may provide a camera lens 127 on the back of the communication device 100, such that a user may use the display 110 as a camera viewfinder for framing an image.

Figure 3A:
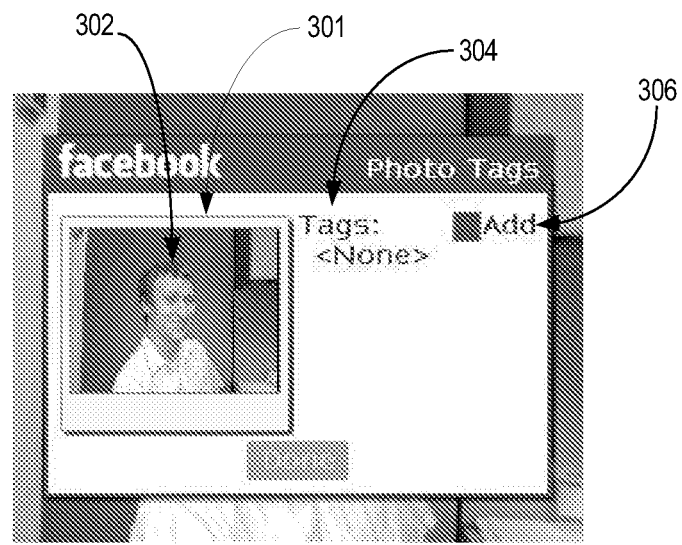
FIGS. 3A to 3E are illustrative user interface screens for editing photo tags in accordance with an embodiment.

Now referring to FIG. 3A, shown is an illustrative user interface screen 300A in which photo tagging module 148A may be configured for tagging a photograph in accordance with an embodiment. As shown, a photo 301 of a subject 302 is displayed within the boundaries of the user interface. With this user interface, a tag list 304 may include various tags associated subject 302 or other subjects or objects within the photo 301. The user may click an "Add" button 306 in order to enter a photo tagging mode as described below.

Figure 3B:
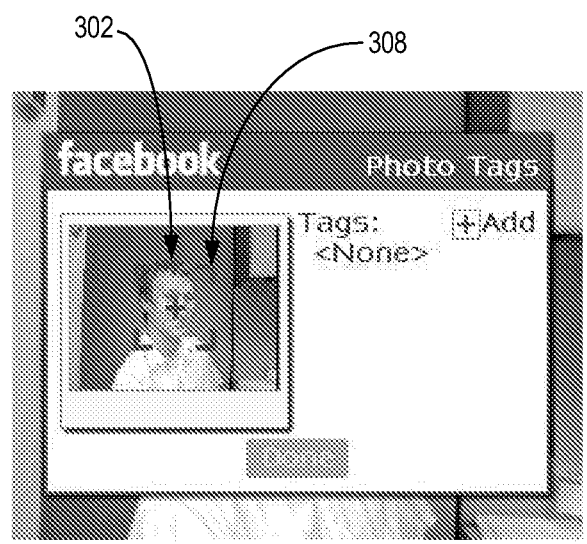

Now referring to FIG. 3B, as shown in screen 300B, once in the photo tagging mode, the photo tagging module 148A may be configured to display to the user a pointer, such as cross-hair pointer 308 on the photo 301. The user may move the cross-hair pointer 308 around the photo 301, but unlike common web browser interfaces, the cross-hair pointer 308 may be constrained by the photo tagging module 148A to be navigable only within the boundaries of the photo 301. The user does not have the ability to move the cross-hair pointer around the rest of the screen and perform other tasks, and the navigation device (e.g. trackball 117) is thus dedicated to this photo tagging function until the user exits tagging mode. As will be appreciated, this may allow users to avoid inadvertently clicking on some button or menu option just outside of the borders photo 301 when attempting to tag a subject or object near an edge of the photo. This may be particularly useful on a smaller display, where greater dexterity may be required in order to navigate within a small area using a small navigation device.

When in tagging mode, the user may cancel tagging mode using the escape key and return to simply viewing the existing tag information. Alternatively, the user may choose to add a tag at the current location of the crosshair pointer 308 using an enter key or clicking on the navigation device (e.g. trackball 117).

If the user chooses to add a tag, the user may be presented with another user interface to select the tag type and the context information associated with the tag. As an illustrative example, the tag types could include a free-form alphanumeric string, Facebook™ friends, address book entries (in address book 142), browser bookmarks (in Internet browser module 138), etc.

Figure 3C:
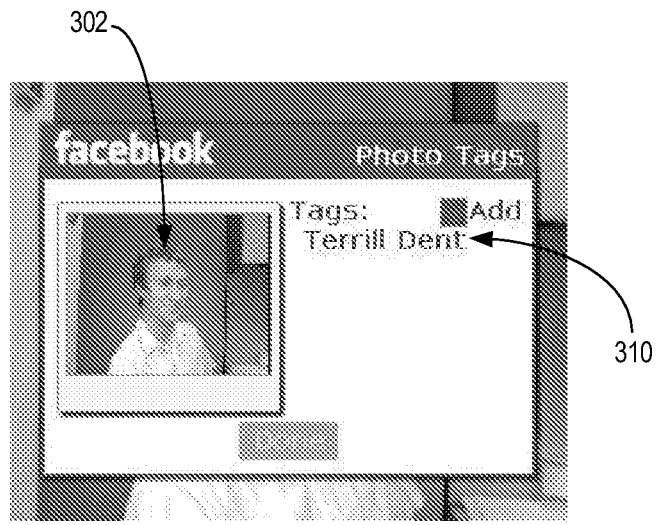

Now referring to FIG. 3C, as shown by way of illustration in screen 300C, when a tag has been added by a user using photo tagging module 148A, the added tag 310 associated with subject 302 may appear in the tag list 304 near the photo 301.

In an embodiment, the tag 310 could also include an icon, or some other type of visual indicator adjacent the tag 310, indicating what type of tag it is. Thus, many different types of tags may be used to tag subjects or objects in the photo 301.

Figure 3D:
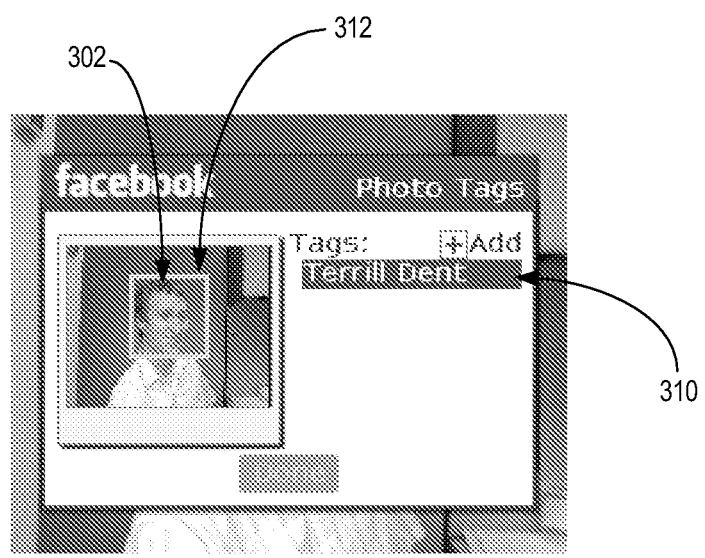
Figure 3E:
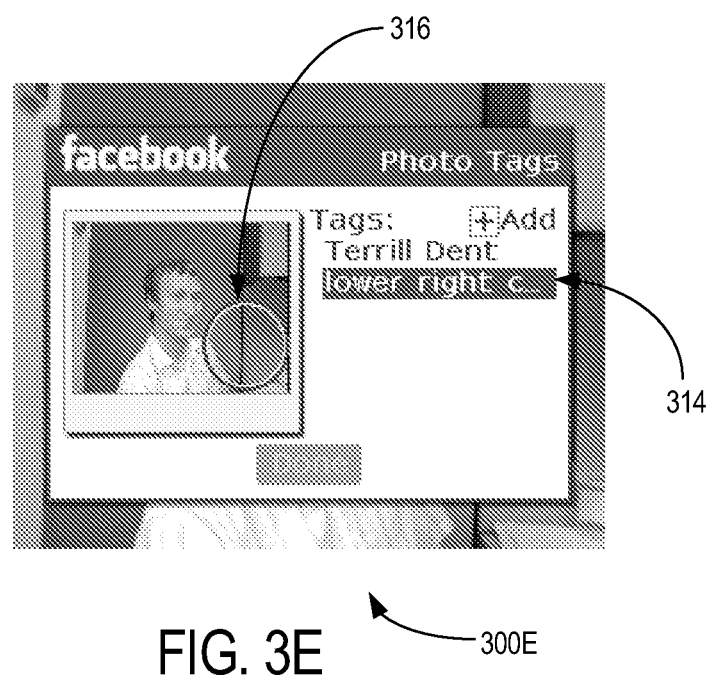

Now referring to FIG. 3D, as shown by illustration in screen 300D, when the user scrolls over the tag 310 in the tag list 304, the corresponding subject 302 in the photo may be highlighted by the photo tagging module 148A in some way. This highlighting could be different, depending on what type of tag it is. For example, for a Facebook™ friend the pointer could be a grey square pointer 312 (e.g. like Facebook uses online). As another example shown in screen 300E of FIG. 3E, for a free-form text tag 314, the tagged point in the photo 301 could be indicated with a circle pointer 316.

When the user scrolls over a tag 310 in the tag list 304, a menu may be activated with options associated with the tag. For example, there may be menu items to edit or delete the tag. There may also be context sensitive menu options associated with the specific tag type. For example, for a Facebook friend there may be an item to view the friend's Facebook profile. For an address book entry, there may be an item to view the user's address card. For a browser bookmark, there may be an item to visit that website.

In another embodiment, once subjects or objects have been tagged in the photo 301, photo tagging module 148A may be configured such that upon user selection of a tag 310 in the tag list 304 the corresponding tagged subject or object in the photo 301 may be highlighted using the corresponding pointer identifying the tag type.

In another embodiment, once subjects (e.g. subject 302) or objects have been tagged in the photo 301, photo tagging module 148A may be configured such that upon user selection of or scrolling over a tagged subject or object in the photo 301, the corresponding tag 310 may be highlighted in the tag list 304. As well, context data associated with the tag may be displayed (e.g. in a pop-up window) upon user selection, or automatically if so configured.

Thus, using the above described user interface, a plurality of tag types may be used to tag subjects and objects in a photo, and a type-specific data may be associated with each tag—such as the visual indicator or symbol used to highlight the tagged subject or object in the photo, the custom actions available for the tag, etc.

Figure 4A:
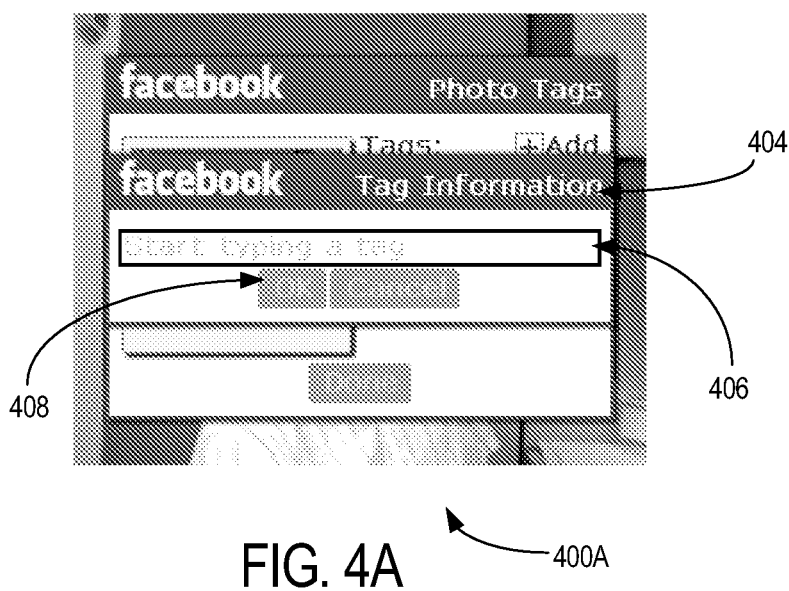
FIGS. 4A to 4F are illustrative user interface screens for selecting a photo tag in accordance with an embodiment.

Now referring to FIG. 4A, shown in screen 400A is an illustrative tag selection user interface 404 for displaying a tag search facility as may be presented by photo tag selection module 148B. As shown in FIG. 4A, the user is initially presented with a tag entry field 406 indicating that he should start typing a tag. Upon completion of typing, the user may click "OK" 408 to select the tag.

Figure 4B:
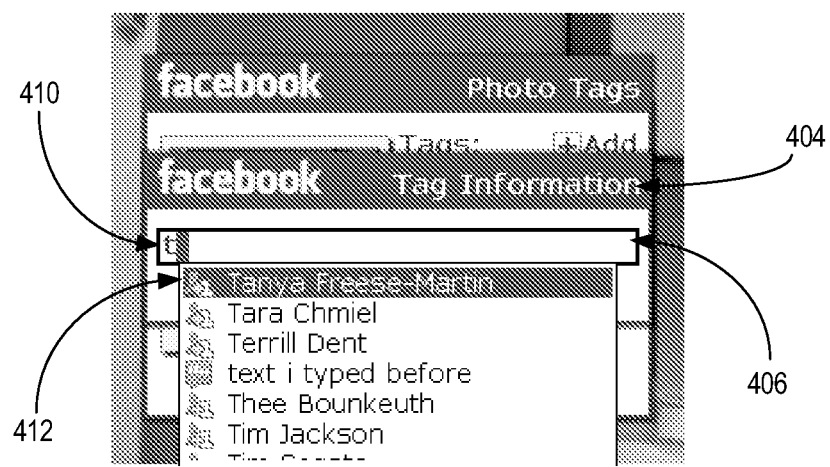

In an embodiment, as the user begins to type, photo tag selection module 148B may be configured to search one or more selected "tag sources" for tags that match the currently entered text. As shown by way of illustration in screen 400B of FIG. 4B, these tag sources could include, for example, a list of friends from an online service like Facebook™, a list of contacts from the user's address book 142, a list of the user's browser bookmarks (in Internet browser 138), a cache of recent free-form text entries, etc.

Figure 4C:
Figure 4D:

As shown in screen 400C of FIG. 4C, and 400D of FIG. 4D, photo tag selection module 148B may be configured to display any matching tags (e.g. 412a, 412b, 412c) from one of the tag sources to the tag being typed by the user in the tag entry field 406 in a matching tag list 412. Each tag may have an icon or some other visual identifier associated with it that clearly indicates its type, and allows the user to quickly distinguish between different types of tags.

If the user types text that does not match any tag from the tag sources in the matching tag list 412, the photo tag selection module 148B may create a new free-form tag entry and add it to a free-form text cache as a new tag entry. The free-form text cache may then become one of the tag sources for any subsequent tag selection by the user.

Figure 4E:
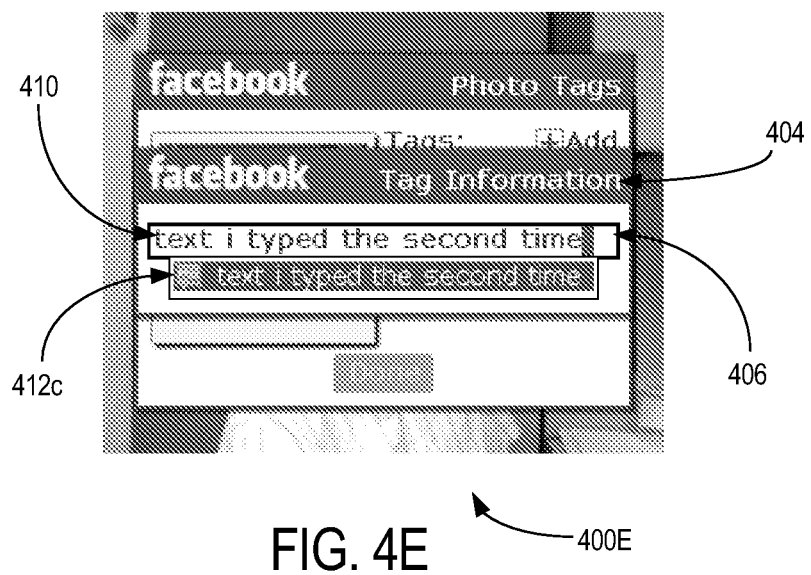

As the user continues to type, if a tag that the user wishes to select appears in the matching tag list 412, the user can scroll to the tag in the matching tag list 412 and select it by pressing enter or clicking on the navigation device (e.g. trackball 117). For example, as shown in screen 400E of FIG. 4E, the user may select a tag 412c which may then be placed into the tag entry field 406. The matching tag list 412 then disappears, and the selected tag may appear beside the photo (e.g. tag 310 as shown in FIG. 3C associated with subject 302 in the photo 301).

Significantly, as the matching tag list 412 includes possible tags that may be used from various selected tag sources (such as the user's Facebook friends, the user's address book 142, a list of the user's browser bookmarks from Internet browser 138, a cache of the recent free-form text entries, etc.), the user is provided with a simple way to associate subjects or objects in a photo with a predefined "tag" from one of a number of selected tag sources, as may be defined by the user. Thus, the free-form text cache would just be one of many possible tag sources, all of which contribute matching tag entries to the matching tag list 412.

Figure 4F:
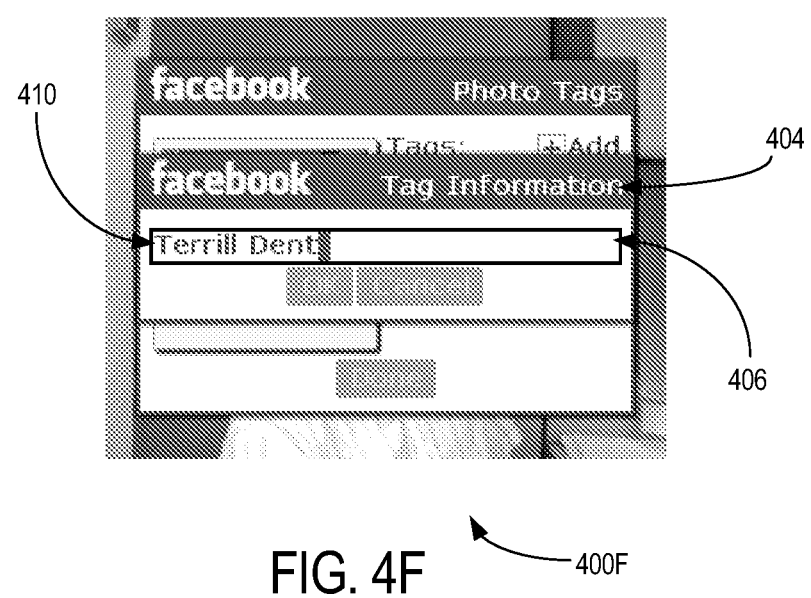

Now referring to FIG. 4F, once a tag has been entered into the tag entry field 406, photo tag selection module 148B may be configured to allow the user to choose to view some context data associated with the tag (e.g. an address card if the tag identifies a contact in the user's address book 142). Finally, photo tag selection module 148B may be configured to allow the user to accept the new tag and return to the photo tagging user interface (described above with respect to FIGS. 3A to 3E), or cancel the tag selection and return to the photo tagging user interface.

In an embodiment, in addition to the tag sources mentioned above, another type of tag source may be landmark tags with associated geographic location information. For example, if a photo contains a number of distinctive landmarks, it may be possible for each landmark to be tagged with a unique geographic location tag (e.g. specific latitude and longitude coordinates for each landmark). Such a list of geographic location tags may be obtained, for example, as a user visits each of the landmarks identified in the photo.

For example, an aerial photo of the National Mall in Washington DC may show a number of famous landmarks such as the Lincoln Memorial, Vietnam Veterans Memorial, and The Washington Monument in the same photo. A user who has visited each of these landmarks, provided appropriate names, and recorded geographic location information at each landmark location may then subsequently select a landmark tag by name from the prepared landmark tag list in order to tag the appropriate points in the photo at which each of the landmarks appear. Once a user tags each landmark appearing in the photo using the appropriate landmark tag, the corresponding geographic coordinates also become available as context based information accessible through the tag.

In an alternative embodiment, a list of famous landmarks for various cities may be prepared by a third party such that a user need not be at each location to record the geographic coordinates. In this case a landmark tag may be selected by a user from a prepared landmark list that may be selected as one of the tag sources.

In the tag selection interface described above, each tag may have some context associated with it, depending on the tag type. As will be appreciated, this associated context may allow the user to visually identify and differentiate between the tag types in the tag selection user interface 404, and present other context sensitive menu options, such as viewing associated address cards, Facebook profiles, websites, geographic location information for landmarks, etc.

Now referring to FIG. 5, shown is a flowchart of an illustrative method 500 in accordance with an embodiment. As shown, method 500 begins and at block 502 where method 500 displays a photo in a display (e.g. display 110) to be tagged.

Method 500 then proceeds to block 504, where method 500 may configure photo tagging module 148A to provide a photo tagging mode for editing tags for the displayed photo.

Method 500 may then proceed to block 506, where for each tag used to tag a subject or object in the photo, method 500 may configure photo tagging module 148A to identify the tag type and associate a unique pointer for each tag type to highlight the corresponding tagged subject or object. For example, as described earlier, a grey square could be used for Facebook friends, and another shape and/or colour may be used for address book tag types.

Method 500 may then proceed to block 508, where method 500 may configure photo tagging module 148A to display a tag list with the displayed photo.

Method 500 may then proceed to block 510, where method 500 may configure photo tagging module 148A to identify the tag type of each tag in the tag list using a visual identifier. For example, the visual identifier may be an icon, or some suitable graphic appearing beside a tag name.

Method 500 may then proceed to block 512, where upon user selection of a tag in the tag list, method 500 may configure photo tagging module 148A to highlight the associated tagged subject or object in the photo using the unique pointer.

Method 500 may then proceed to block 514, where upon user selection of a tag in the tag list, method 500 may configure photo tagging module 148A to highlight the associated tag in the tag list.

Method 500 may also proceed to block 516, where method 500 may configure photo tagging module 148A to display context data associated with a tag. For example, context data associated with an address book type may be the email address, name, and other information stored in the address book module 138 for the corresponding address book entry. In an embodiment, the context data associated with the tag could be displayed within a menu that may be accessed by a suitable menu selection associated with each tag. Method 500 then ends.

Method 500 may also proceed to block 518, where method 500 may configure photo tagging module 148A to constrain the navigation device pointer to be navigable only within the boundaries of the photo.

Figure 6:
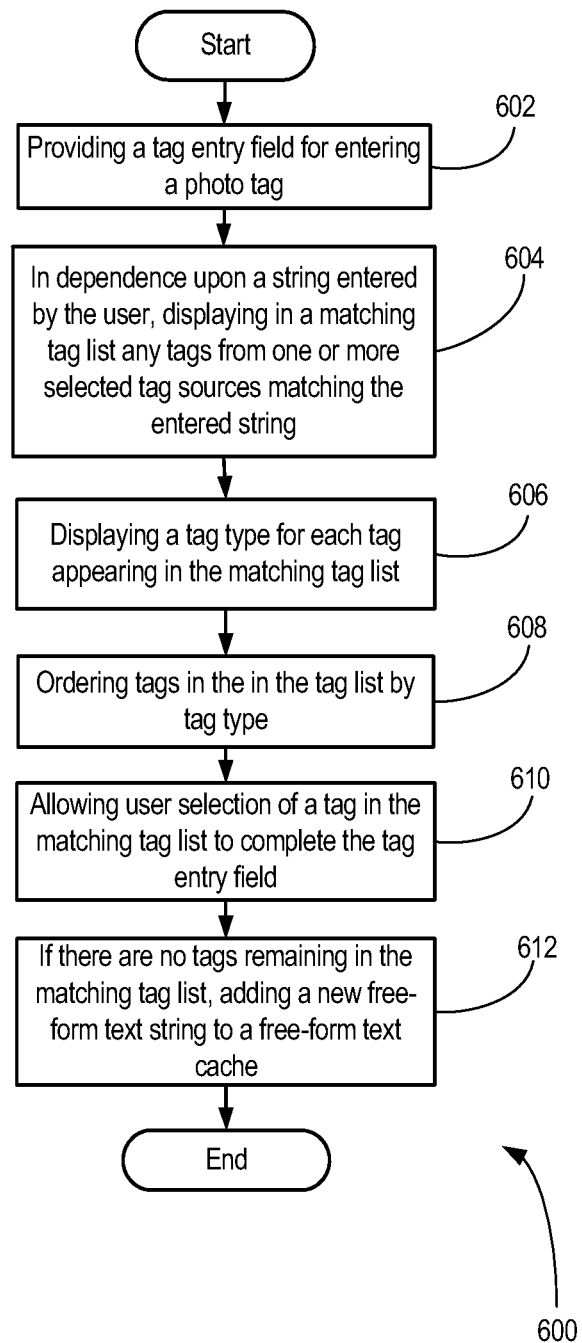
FIG. 6 is an illustrative flowchart of a method for selecting a photo tag in accordance with an embodiment.

Now referring to FIG. 6, shown is a flowchart of an illustrative method 600 in accordance with an embodiment. As shown, method 600 begins and at block 602 where method 600 provides a tag entry field for identifying a photo tag.

Method 600 may then proceed to block 604, where in dependence upon a string entered by the user in the tag entry field, method 600 may configure photo tag selection module 148B to display in a matching tag list 412 any tags (412a, 412b, 412c) matching the entered string.

Method 600 may then proceed to block 606, where method 600 may configure photo tag selection module 148B to display a tag type for each tag appearing in the matching tag list 412. For example, the visual identification may be an icon, or other suitable graphic identification appearing with the tag name.

Method 600 may then proceed to block 608, where method 600 may configure photo tag selection module 148B to order the matching tags in the tag list by tag type in order to make is easier for the user to select a suitable tag by tag type.

Method 600 may then proceed to block 610, where method 600 may configure photo tag selection module 148B to allow user selection of a tag in the matching tag list to complete the tag entry field 406.

Method 600 may then proceed to block 612, where if there are not matching tags appearing in the matching tag list 412, then method 600 may add the new free-from text tag to a free-form text tag cache.

Method 600 may then proceed to block 614, where method 600 may configure photo tag selection module 148B to select the free-form text tag cache as one of the tag sources for any subsequent tag selection by the user. Method 600 then ends.

Thus, in accordance with an embodiment, there is provided a method of editing photo tags, comprising: displaying a photo on a display; providing a photo tagging mode for editing tags for the displayed photo; and for each tag used to tag a subject or object in the photo, identifying the tag type and associating a unique pointer for each tag type to highlight the corresponding tagged subject or object.

In an embodiment, the method further comprises: displaying a tag list of tags used to tag a subject or object in the photo; and identifying the tag type of each tag in the tag list.

In another embodiment, the method further comprises displaying a unique visual identifier to identify the tag type of each tag in the tag list.

In another embodiment, the method further comprises highlighting, upon user selection of a tag in the displayed tag list, the associated subject or object in the photo using the unique pointer associated with the tag type.

In another embodiment, the method further comprises highlighting, upon user selection of a tagged subject or object in the photo, the associated tag in the tag list.

In another embodiment, the method further comprises displaying context data associated with the highlighted tag in the tag list.

In another embodiment, the method further comprises providing a user controllable navigational device pointer operable in the photo tagging mode and navigable only within the boundaries of the photo to tag a subject or object in the photo.

In another aspect of the invention, there is provided a system for editing photo tags, comprising: means for displaying a photo on a display; means for providing a photo tagging mode for editing tags for the displayed photo; and means identifying the tag type for each tag used to tag a subject or object in the photo, and associating a unique pointer for each tag type to highlight the corresponding tagged subject or object.

In an embodiment, the system further comprises: means for displaying a tag list of tags used to tag a subject or object in the photo; and means for identifying the tag type of each tag in the tag list.

In an embodiment, the system further comprises means for displaying a unique visual identifier to identify the tag type of each tag in the tag list.

In another embodiment, the system further comprises means for highlighting, upon user selection of a tag in the displayed tag list, the associated subject or object in the photo using the unique pointer associated with the tag type.

In another embodiment, the system further comprises means for highlighting, upon user selection of a tagged subject or object in the photo, the associated tag in the tag list.

In another embodiment, the system further comprises means for displaying context data associated with the highlighted tag in the tag list.

In an embodiment, the system further comprises a user controllable navigational device pointer operable in the photo tagging mode and navigable only within the boundaries of the photo to tag a subject or object in the photo.

In another aspect of the invention, there is provided a data processor readable medium containing data processor code that when loaded into a device adapts the device to edit photo tags, the data processor readable medium comprising: code for displaying a photo on a display; code for providing a photo tagging mode for editing tags for the displayed photo; and code for identifying, for each tag used to tag a subject or object in the photo, the tag type and associating a unique pointer for each tag type to highlight the corresponding tagged subject or object.

In an embodiment, the data processor readable medium further comprises: code for displaying a tag list of tags used to tag a subject or object in the photo; and code for identifying the tag type of each tag in the tag list.

In another embodiment, the data processor readable medium further comprises code for displaying a unique visual identifier to identify the tag type of each tag in the tag list.

In an embodiment, the data processor readable medium further comprises code for highlighting, upon user selection of a tag in the displayed tag list, the associated subject or object in the photo using the unique pointer associated with the tag type.

In an embodiment, the data processor readable medium further comprises code for highlighting, upon user selection of a tagged subject or object in the photo, the associated tag in the tag list.

In an embodiment, the data processor readable medium further comprises code for providing a user controllable navigational device pointer operable in the photo tagging mode and navigable only within the boundaries of the photo to tag a subject or object in the photo.

While illustrative embodiments have been described above, it will be appreciated that various changes and modifications may be made. More generally, the scope of the invention is defined by the following claims.

What is claimed is:

1. A method comprising:
   rendering a photo on a display of a communications device, the photo including an object;
   obtaining a tag type for an online service associated with the object, the tag type including a tag type pointer that visually identifies the online service, the tag type pointer having a unique visual characteristic that is specifically assigned to the online service;
   rendering a photo tagging mode interface configured to:
   prompt for selection of the object within the photo;
   populate a tag in a tag list, the tag corresponding to the selected object;
   prompt for selection of the tag type to be associated with the tag;
   render the tag type pointer overlayed on the selected object in the photo upon selecting the tag in the tag list; and
   upon selecting the tag, render a menu of options associated with the object and the tag type.

2. The method of claim 1, wherein the photo tagging interface is further configured to:
   render the tag list associated with the photo; and
   identify the corresponding tag type proximate to each tag in the tag list.

3. The method of claim 2, wherein the photo tagging interface is further configured to render a visual identifier adjacent to each tag to identify the corresponding tag type of each tag in the tag list.

4. The method of claim 2, wherein the photo tagging interface is further configured to:
   upon selecting the tags in the tag list, rendering the tag type pointer overlayed on the object to visually identify the online service associated with the tag type.

5. The method of claim 2, wherein the photo tagging interface is further configured to:
   upon selecting the object rendered in the photo, highlight the associated tag in the tag list.

6. The method of claim 5, wherein the photo tagging interface is further configured to render context data associated with the highlighted tag in the tag list.

7. The method of claim 1, wherein the communications device is a wireless mobile communications device and wherein the photo tagging interface restricts the pointer to navigate within boundaries of the photo.

8. The method of claim 1, wherein the tag type is one of a free-form tag, a social network tag, an address book tag, and a browser bookmark tag.

9. A communications device comprising:
   a processor;
   a display;
   a non-transitory computer-readable storage medium storing instructions, which when executed by the processor, cause the communications device to perform steps comprising:
   rendering a photo on the display of the communications device, the photo including an object;
   obtaining a tag type for an online service associated with the object, the tag type including a tag type pointer that visually identifies the online service, the tag type pointer having a unique visual characteristic that is specifically assigned to the online service;
   rendering a photo tagging mode interface configured to:
   prompt for selection of the object within the photo;
   populate a tag in a tag list, the tag corresponding to the selected object;
   prompt for entry of the tag type to be associated with the tag;
   render the tag type pointer overlayed on the selected object in the photo upon selecting the tag in the tag list; and
   upon selecting the tag, render a menu of options associated with the object and the tag type.

10. The communications device of claim 9, wherein the instructions, when executed by the processor, cause the communications device to perform steps further comprising:
    rendering the tag list associated with the photo; and
    identifying the corresponding tag type proximate to each tag in the tag list.

11. The communications device of claim 10, wherein the instructions, when executed by the processor, cause the communications device to perform steps further comprising rendering a visual identifier adjacent to each tag to identify the corresponding tag type of each tag in the tag list.

12. The communications device of claim 10, wherein the instructions, when executed by the processor, cause the communications device to perform steps further comprising:
    upon selecting the tags in the tag list, rendering the tag type pointer overlayed on the object to visually identify the online service associated with the tag type.

13. The communications device of claim 10, wherein the instructions, when executed by the processor, cause the communications device to perform steps further comprising:
    upon selecting the object rendered in the photo, highlighting the associated tag in the tag list.

14. The communications device of claim 13, wherein the instructions, when executed by the processor, cause the communications device to perform steps further comprising rendering context data associated with the highlighted tag in the tag list.

15. The communications device of claim 10, wherein the photo tagging interface is further configured to restrict the pointer to navigate within boundaries of the photo to tag the one or more objects in the photo.

16. A non-transitory, data processor readable medium containing data processor code that when loaded into a device adapts the device to edit photo tags, the data processor readable medium comprising:
- code for rendering a photo on a display of a communications device, the photo including an object;
- code for obtaining a tag type for an online service associated with the object, the tag type including a tag type pointer that visually identifies the online service, the tag type pointer having a unique visual characteristic that is specifically assigned to the online service;
- code for rendering a photo tagging mode interface configured to:
  - prompt for selection of the object within the photo;
  - populate a tag in a tag list, the tag corresponding to the selected object;
  - prompt for entry of the tag type to be associated with the tag;
  - render the tag type pointer overlayed on the selected object in the photo upon selecting the tag in the tag list; and
  - upon selecting the tag, render a menu of options associated with the object and the tag type.

17. The non-transitory, data processor medium of claim 16, further comprising:
- code for rendering the tag list associated with the photo; and
- code for identifying the corresponding tag type proximate to each tag in the tag list.

18. The non-transitory, data processor medium of claim 17, further comprising code for rendering a visual identifier adjacent to each tag to identify the corresponding tag type of each tag in the tag list.

19. The non-transitory, data processor medium of claim 17, further comprising:
- code for, upon selecting the tags in the tag list, rendering the tag type pointer overlayed on the object to visually identify the online service associated with the tag type.

20. The non-transitory, data processor medium of claim 17, further comprising code for, upon selecting the object rendered in the photo, highlighting the associated tag in the tag list.

21. The non-transitory, data processor medium of claim 16, wherein the photo tagging interface is further configured to restrict the pointer to navigate only within boundaries of the photo to tag the one or more objects in the photo.

* * * * *